United States Patent
Brueckner et al.

(10) Patent No.: US 7,305,371 B2
(45) Date of Patent: Dec. 4, 2007

(54) SWARMING AGENTS FOR DISTRIBUTED PATTERN DETECTION AND CLASSIFICATION

(75) Inventors: Sven Brueckner, Ann Arbor, MI (US); H. Van Dyke Parunak, Ann Arbor, MI (US)

(73) Assignee: NewVectors LLC, Ann Arbor, MI (US)

( * ) Notice: Subject to any disclaimer, the term of this patent is extended or adjusted under 35 U.S.C. 154(b) by 492 days.

(21) Appl. No.: 10/352,288

(22) Filed: Jan. 27, 2003

(65) Prior Publication Data

US 2003/0142851 A1 Jul. 31, 2003

Related U.S. Application Data

(63) Continuation-in-part of application No. 09/900,251, filed on Jul. 6, 2001.

(60) Provisional application No. 60/351,519, filed on Jan. 25, 2002.

(51) Int. Cl.
*G06K 9/00* (2006.01)
*G06N 5/00* (2006.01)

(52) U.S. Cl. .................. 706/45; 700/247; 700/245; 382/109

(58) Field of Classification Search .................. 706/45; 700/247, 245; 382/109
See application file for complete search history.

(56) References Cited

U.S. PATENT DOCUMENTS

| | | | |
|---|---|---|---|
| 6,687,571 B1 * | 2/2004 | Byrne et al. ................. | 700/245 |
| 6,799,087 B2 * | 9/2004 | Estkowski .................. | 700/245 |
| 6,801,819 B1 * | 10/2004 | Barto et al. .................. | 700/99 |
| 6,904,335 B2 * | 6/2005 | Solomon ..................... | 700/247 |
| 7,203,342 B2 * | 4/2007 | Pedersen .................... | 382/109 |

* cited by examiner

*Primary Examiner*—Wilbert L Starks, Jr.
(74) *Attorney, Agent, or Firm*—Gifford, Krass, Sprinkle, Anderson & Citkowski, PC (57) ABSTRACT

Swarming agents in networks of preferably physically distributed processing nodes are used for data acquisition, data fusion, and control applications. An architecture for active surveillance systems is presented in which simple mobile agents collectively process real-time data from heterogeneous sources at or near the origin of the data. System requirements are specifically matched to the needs of a surveillance system for the early detection of large-scale bioterrorist attacks on a civilian population, but the same architecture is applicable to a wide range of other domains. The pattern detection and classification processes executed by the proposed system emerge from the coordinated activities of agents of two populations in a shared computational environment. Detector agents draw each other's attention to significant spatio-temporal patterns in the observed data stream. Classifier agents rank the detected patterns according to their respective criterion. The resulting system-level behavior is adaptive, robust, scalable, and applicable to a wide variety of other situations, including surveillance, financial transactions, network diagnosis, power grid monitoring, and others.

40 Claims, 5 Drawing Sheets

SWARMING AGENTS FOR DISTRIBUTED PATTERN DETECTION AND CLASSIFICATION

REFERENCE TO RELATED APPLICATIONS

This application claims priority from U.S. Provisional Patent Application Ser. No. 60/351,519, filed Jan. 25, 2002, and is a continuation-in-part of U.S. patent application Ser. No. 09/900,251, filed Jul. 6, 2001, the entire content of each application is incorporated herein by reference.

FIELD OF THE INVENTION

This invention relates generally to distributed interactivity and, in particular, to the deployment of swarming agents in networks of physically distributed processing nodes to perform data acquisition, data fusion, and control functions.

BACKGROUND OF THE INVENTION

Driven by the need for more efficiency and agility in business and public transactions, digital data has become increasingly accessible through real-time, global computer networks. These heterogeneous data streams reflect many aspects of the behavior of groups of individuals in a population, including traffic flow, shopping and leisure activities, healthcare, and so forth.

In the context of such behavior, it has become increasingly difficult to automatically detect suspicious activity, since the patterns that expose such activity may exist on many disparate levels. Ideally, combinations of geographical movement of objects, financial flows, communications links, etc. may need to be analyzed simultaneously. Currently this is a very human-intensive operation for an all-source analyst.

Active surveillance of population-level activities includes the detection and classification of spatio-temporal patterns across a large number of real-time data streams. Approaches that analyze data in a central computing facility tend to be overwhelmed with the amount of data that needs to be transferred and processed in a timely fashion. Also, centralized processing raises proprietary and privacy concerns that may make many data sources inaccessible.

In the event of a large-scale bioterrorist attack on a civilian population, for example, triggering the emergency response system even at the first positive diagnosis of a disease caused by a CDC-class A bioterrorist pathogen (e.g., airborne anthrax) may still too late to prevent thousands of deaths, a breakdown of the public health system or civil disorder. Such a disaster can only be prevented when the emerging epidemic is caught while the symptoms of the infected people are still unspecific and very similar to common diseases (e.g., influenza).

New sensor and information technology may be used to detect an attack from the subtle changes in population behavior that usually precede the first medical diagnosis by a significant amount of time. Behavioral patterns in the community are likely to change as people fall ill. This change is reflected in many different population activity indicators (e.g., school absenteeism, traffic patterns) that are increasingly accessible in real-time. A system that surveys multiple data points in real-time may be more successful in triggering an alert than any single data source.

The detection and classification of subtle changes in the population activity requires the integration of a wide variety of non-specific real-time data sources into the operation of the surveillance system. The providers of the data are often very sensitive to proprietary and privacy concerns. For instance, local sales figures of various over-the-counter remedies at individual pharmacies are an invaluable contribution to a biosurveillance system, but the owner of the data (the merchant) must be assured that this data does not reach its competitors. Also important is data from the public healthcare system, such as the number of patients inquiring about certain symptoms at their physician. But the surveillance system is only permitted to work with anonymized data.

The use of non-specific data sources for the early detection of an epidemic in a population requires the integration of many population activity indicators to achieve the required sensitivity and specificity. Furthermore, to guarantee the early detection of an outbreak, the system must operate on real-time data that is updated at least several times a day. As a result, there is an immense amount of data that needs to be processed in a timely fashion.

A biosurveillance system must be robust against cyber attacks and component failures, inexpensive and unobtrusive in its day-to-day operation. Such a system should also be intuitive in its reporting, and designed for low-cost adaptivity and scalability along various dimensions, including the spread and complexity of population patterns, types and locations of data sources, and detected symptoms and diseases, or detected attack patterns.

The need remains, therefore for a new generation of active surveillance systems to integrate a large number of spatially distributed heterogeneous data streams. Such a capability may be used in various applications, for instance, to protect a civilian population from bioterrorist attacks, to support real-time traffic coordination systems, to trace collaboration structures in terrorist networks, or to manage public healthcare efficiently.

SUMMARY OF THE INVENTION

This invention resides in a swarming agent architecture for the distributed detection and classification of spatio-temporal patterns in a heterogeneous real-time data stream. Importantly, however, the invention is not limited to geographic structures or patterns in Euclidean space, and is more generically applicable to non-Euclidean patterns such as topological relations in abstract graph structures. Thus, as used herein, including the claims, "spatio-temporal" should be taken to include both Euclidean and non-Euclidean constructs, including "topological-temporal" patterns.

In the preferred embodiment, large populations of simple mobile agents are deployed in a physically distributed network of processing nodes. At each such node, a service agent enables the agents to share information indirectly through a shared, application-independent runtime environment. The indirect information sharing permits the agents to coordinate their activities across entire populations.

The architecture may be adapted to the detection of various spatio-temporal patterns and new classification schemes may be introduced at any time through new agent populations. The system is scalable in space and complexity due to the consequent localization of processing and interactions. The system and method inherently protect potentially proprietary or private data through simple provable local processes that execute at or near the actual source of the data.

The fine-grained agents, which swarm in a large-scale physically distributed network of processing nodes, may be designed to perform three major tasks: 1) they may use local sensors to acquire data and guide its transmission; 2) they may fuse, interpolate, and interpret data from heterogeneous sources, and 3) they may make or influence command and control decisions. In contrast to previous approaches involved with command and control [11] [4] and data acquisition and transmission [6], this invention resides in a swarming agent architecture for distributed pattern-detection and classification. Although the decentralized approach is described in terms of an active surveillance system for epidemic outbreaks caused by a large-scale bioterrorist attack on a civilian population, the same architecture may be applied to a wide variety of other surveillance applications, including financial transactions, network diagnosis, and power-grid monitoring.

BRIEF DRAWINGS OF THE INVENTION

DETAILED DESCRIPTION OF THE INVENTION

This invention uses decentralization to avoid problems associated with existing methods. Instead of transferring data to a centralized processing facility, relevant processes (fine-grained agents) are transferred to the data sources. As a consequence, significantly less data needs to be transferred over long distances and access restrictions may be guaranteed through proven local processes.

To accomplish this goal, swarm intelligence techniques [9] [2] are employed to globally coordinate local data processing. The swarm intelligence design approach adapts robust, self-organizing coordination mechanisms observed in distributed natural systems (e.g., social insect colonies) to engineered systems. One of the most powerful global coordination mechanisms in distributed biological systems is stigmergy [7], which comes from the Greek words stigma "sign" and ergos "work." The work performed by the agents in the environment in turn guides their later actions, resulting in a feedback loop that establishes dynamic information flows across the population and guides its operation.

A distributed swarming agent architecture is the most appropriate answer to the challenge of detecting spatio-temporal patterns in a network of heterogeneous sources of potentially proprietary real-time data. Instead of attempting to stream a tremendous amount of data into a central processing facility, we propose to integrate the external sources into a network for mobile agent computing. Essentially, this network of agent processing nodes is a massively parallel computer for pattern detection and classification with a unique way of self-organizing the processing tasks.

Into our network of processing nodes, we deploy large populations of simple mobile agents that coordinate their activities in stigmergetic interactions. Using artificial pheromones—spatio-temporally localized numerical variables—the agents dynamically organize themselves around patterns observed in the data streams.

The emergence of globally coordinated behavior through stigmergetic interactions among many fine-grained software agents in a shared computational environment is facilitated by a component of the distributed runtime environment that emulates actual pheromone dynamics (aggregation, evaporation, dispersion) in the physical world. The operation of this component—we call it the pheromone infrastructure—is described in detail in the following section.

Our heterogeneous agent system continuously executes two parallel processes: pattern detection and pattern classification. More populations of agents could be deployed at any time, for instance to introduce additional criteria in the detection process, or to add more classification schemes.

The agents executing the detection process ("Detectors") continuously process the input data and search for spatio-temporal structures. Detectors use pheromones of one set of flavors to focus their search dynamically on suspicious areas of the network, while a second set is used to communicate the result of the detection process. In the software example presented below, Detectors search for unusually high differences in the data streams of neighboring locations in the network.

"Classifier" agents are responsible for the classification of the detected patterns according to a particular classification scheme. If multiple schemes are applied in parallel, then there are Classifiers of as many sub-populations as there are schemes and each sub-population uses a different pheromone flavor to communicate its results. The pattern classification scheme used in our demonstration correlates the detected patterns with a particular, dynamically changing geographic direction (wind). Patterns that show a strong alignment with the chosen direction are highlighted by the Classifiers.

Figure 1:
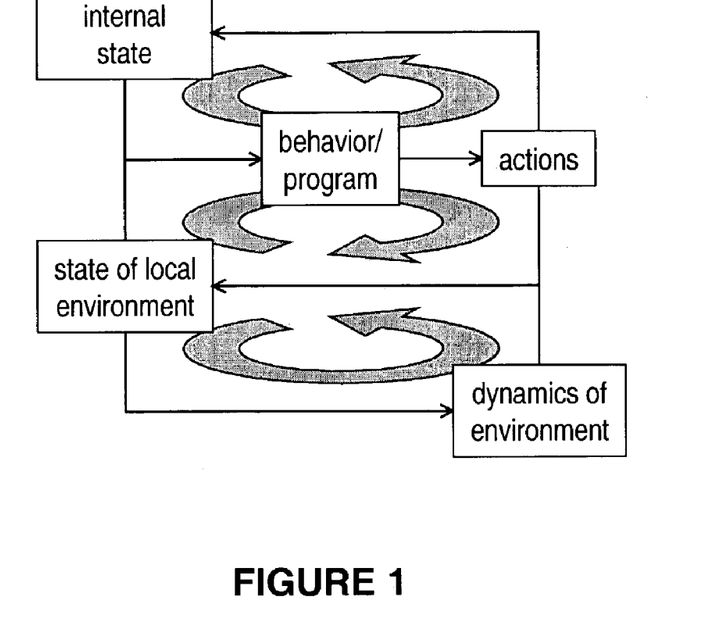
FIG. 1 is a diagram which shows "stigmergy" links associated with environmental dynamics and agent processes according to the invention.

In the following sections we first review the operation of the pheromone infrastructure. Then we describe the agents of the detection and classification processes in greater detail. The agents in our pattern detection and classification architecture coordinate their activity and communicate their results through markers in a shared dynamic environment. These stigmergetic interactions give rise to a robust self-organizing system-level behavior that rests on the feedback between the dynamics of the individual agents and the processes that manipulate information in the agents' environment (FIG. 1).

Marker-based stigmergy in social insect colonies uses chemical markers (pheromones) that the insects deposit on the ground in specific situations (e.g., food found). Multiple deposits at the same location aggregate in strength. Members of the colony who sense pheromones of a particular flavor may change their behavior (e.g., follow pheromone trail to food source). Pheromone concentrations in the environment disperse in space and evaporate over time, because pheromones are highly volatile substances.

Reference [4] specifies and analyzes an application-independent component for distributed agent runtime environments that emulates the dynamics of pheromone aggregation, dispersion, and evaporation for fine-grained software agents. The pheromone infrastructure represents concentrations of pheromones as scalar numerical values assigned to a particular location in a discrete space. Different pheromone flavors are distinguished through values of additional tags attached to a pheromone. A tag is a particular attribute that may carry a value from a given domain. For instance, all pheromones in the application described here share a tag for a discretized time value.

The spatial structure of the pheromone infrastructure is captured in a network of places. A place is a location where agents may deposit or sense pheromones and where the infrastructure manipulates local concentrations. We use places to represent the structure of the problem space in which the agents coordinate their activities. This space may be the physical space (e.g., city blocks), temporal space (e.g., a machine schedule), or even some abstract graph (e.g., role graph in a template for a robotic team that executes a specific mission).

Each deposit of a pheromone at a particular place specifies a number of tags and a numerical concentration value. The strengths of all deposits at the place that specify the same tags are added together. The pheromone's propagation factor specifies the proportion of the deposit that is passed to neighboring places. A factor of zero prevents all propagation. The evaporation factor specifies the rate of reduction of the pheromone concentration at a place over time.

Figure 2:
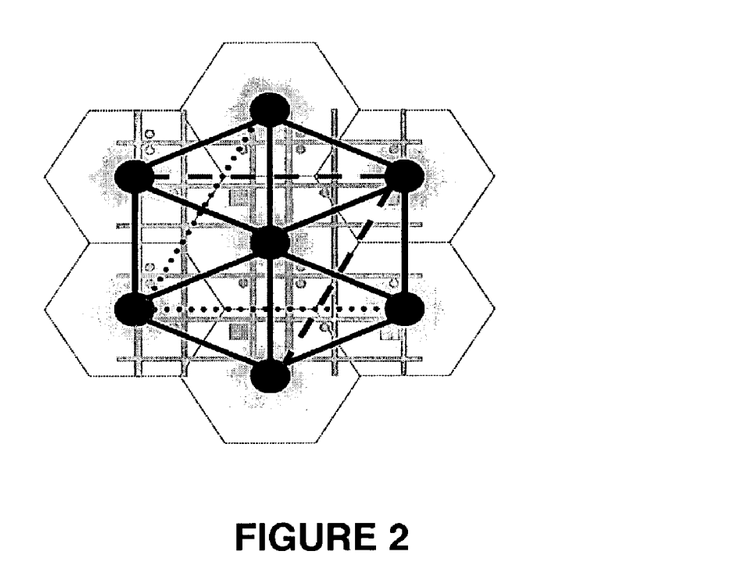
FIG. 2 is a diagram which shows how places may represent segments of a region of interest interconnected in spatial and/or social relations.

Previously, we used the services of the pheromone infrastructure in manufacturing control [4] and in combat coordination [11] applications. To illustrate the present invention, we use the example of a biosurveillance application, in which the network of places represents the spatial and social structure of the protected population. It will be apparent to one skilled in the appropriate arts that this example is illustrative and not restrictive, and that the mechanisms taught here are substantially applicable to other applications. A place "covers" a unique segment of the region in which the system is deployed and neighborhood relations among places reflect physical neighborliness (adjacency of segments) as well as social connectedness (population movement and interaction patterns) of these segments (FIG. 2). In the example application, the places are geographic regions, but in other applications they might represent more abstract regions, such as a contiguous subgraph of an abstract graph structure (for example, an ontology or concept map).

The spatial structure of the pheromone dynamics immediately carries over into the structure of the agent processing network as well as into the spatial structure of agent activities itself. The computational processing takes place on a network of real or virtual processors. Each processor corresponds to a place, and is preferably located at the segment for which it is responsible. It executes a Place agent that provides the services of a place in the pheromone infrastructure. This Place Agent provides the swarming agents of the actual application with several services: it implements the local pheromone dynamics, provides topological information concerning neighboring places, and manages the local agent directory for dynamic interactions among agents currently resident on the place. Optionally, a processor may also execute a Data Provider agent that gives agents resident on the place access to data characteristic of the place. Such data might (by way of example but not limitation) include sensory data obtained from the place, data from a database located at the place, information from a point of sale terminal, or results of local computations performed by specialized computational hardware associated with the processor.

Real-time data streams are processed from heterogeneous and spatially distributed sources without transferring the data to a centralized computing resource. Rather, we use mobile agents to process the data near its respective source in a network of processing nodes. A Place agent occupies the processing node and provides the application agents with a unified interface (XML-based) to the data streams that are located in the segment covered by the place. This localization of the access directly addresses privacy and proprietary concerns that arise when commercial or protected data is used in the application. Such data is essential in the Biosurveillance application, since most of the available population activity indicators are either commercial (e.g., pharmacy sales, work absenteeism) or healthcare related (e.g., calls to physician).

The Place agent continuously gathers the data from its local sources and stores it at the processing node to provide fast access by the agents. The data samples are tagged with the time the sample was taken and data above a certain age (the data availability horizon) is deleted by the Place agent. Thus, the application agents may operate on a set of value profiles (samples over time), one for each individual local source. Providing interaction protocols that allow the application agents to deposit pheromones and sense local concentrations, and executing the dynamics of pheromone aggregation, dispersion, and evaporation are the main tasks of a Place agent.

The agents of the application move dynamically through the network of processing nodes. To ensure the scalability of our architecture and to provide robustness to node failures and topology changes, no global map of the place network is provided. Instead, application agents request local topology information from their local Place agent at the time of their move. In return they receive a list of direct neighbors of the place (spatial and social neighborhood) and they are only permitted to move to these locations.

The dynamical nature of the agent architecture does not permit fixed interaction structures. Rather, agents choose their interaction partners dynamically, depending on their current situation (e.g., agent location, local pheromone concentrations, internal agent state). The Place agents act as facilitators by providing the application agents with local directory information concerning other application agents on the same place. Consequentially, all agent interactions are localized, which focuses the system's attention and reduces the need for communication bandwidth, a feature that will be crucial in real-world applications (see for instance [1]).

Pattern Detection

Detector agents face the problem of finding global patterns across spatially-distributed heterogeneous real-time data sources while they are only able to process data locally. Thus, it is actually the population of Detectors that identifies a pattern, not the agents themselves. Also, the Detectors have to calibrate their joint sensitivity dynamically, since the same local values may be considered part of a clear pattern at one time and barely distinguishable at another depending on the overall data stream.

Figure 3:
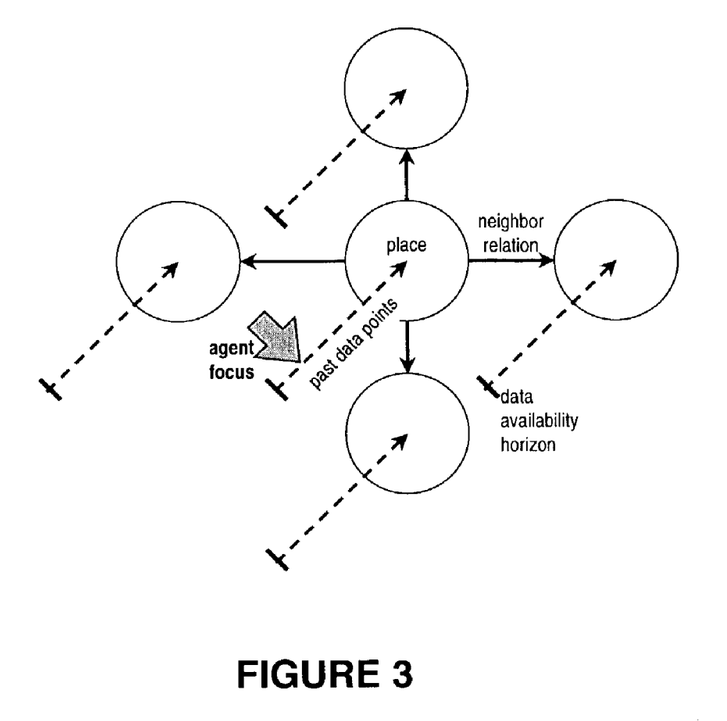
FIG. 3 is a diagram that depicts the spatio-temporal focus of an agent as it moves through a space covered by a system according to the invention.

These two population tasks break down to two questions for the individual agent: a) where to focus the search; and b) what to declare part of a pattern. The first question addresses the dynamically changing spatial and temporal focus of an agent. Detector agents are able to move from place to place and they can shift their focus at different periods in the local data streams (FIG. 3). Thus, an agent needs guidance for its spatial and temporal moves.

The second question addresses the problem of normalization across space and time. If the agents were able to access all the data streams at once, they could easily determine the maximum value and normalize all the data. Then, a threshold would separate background locations from components of a pattern. Without the global access to data, Detector agents have to find other means to determine that threshold.

Given the decentralized nature of the agent environment and the scale of the Detector population—in the hundreds or even thousands depending on the size of the system—both questions have to be answered collectively. We establish two coordination processes among the Detector agents, one based on pheromones in the shared environment to guide the agents' movement, the other one based on repeated direct interactions (face-offs) among the agents to establish the current global maximum.

A Detector tries to align its focus with the location of a pattern in the heterogeneous data stream. A location designates not only a region in space, but also a point in time in the recent past, since the data in the stream changes over time. The spatial focus of the agent is simply its current place in the pheromone infrastructure, while its temporal focus is set in an internal variable. Thus, the agent moves its focus either by moving to a neighboring place, or by incrementing or decrementing its internal variable. Movements are restricted to the region covered by the pheromone infrastructure and by the horizon, beyond which data is no longer stored at the places. As real time advances, an agent's temporal focus may become invalid (outside the horizon), in which case the agent's focus is automatically moved to remain at the horizon.

With every movement of its focus, a Detector agent assesses the evidence that the data of the local real-time sources in its spatio-temporal focus is part of a pattern. The definition of a pattern depends on the particular application of the detection mechanism. For instance, in the software demonstration presented below, the Detectors search for locations where the data shows a strong spatial gradient. Other applications, for instance biosurveillance, may search for spatio-temporal locations where the observed data significantly deviates from an established normal baseline.

The Detectors collectively coordinate their search, using pheromones to guide their individual movements. This stigmergic coordination mechanism balances two conflicting trends: Detectors are attracted to locations which other Detectors identified as part of a potential pattern, but Detectors are at the same time repelled by large concentrations of other Detectors. The attractive force recruits agents to potential patterns to reinforce the finding of other agents. The repulsive force limits the recruitment to prevent the system from being locked into only one solution. In recruitment mechanisms in nature such a limit is "built in" automatically by spatial limitations, since two physical entities cannot occupy the same space at the same time.

Figure 4:
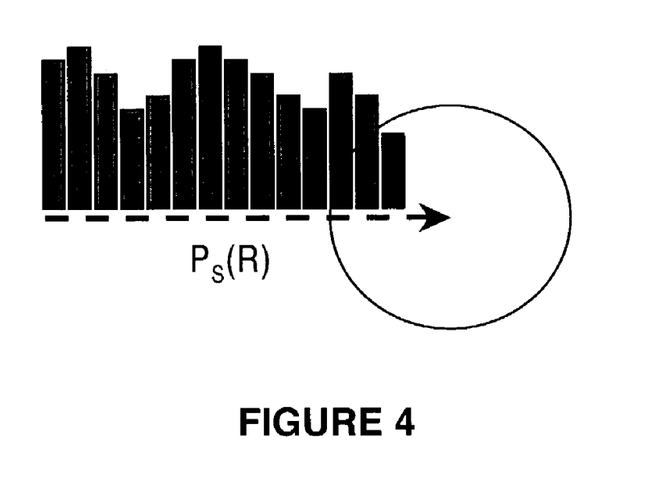
FIG. 4 is a graph which shows how local pheromone concentrations translate into a force profile over time.

Agents dynamically create the attractive and repulsive forces through individual context-dependent pheromone deposits. The "Search" pheromone (PS) has two major flavors; PS(A) concentrations are considered attractive, while PS(R) concentrations repel agents from a spatio-temporal location. The place at which a PS pheromone concentration is sampled determines the spatial component of the location to which the pheromone refers. The temporal component is expressed with an additional tag attached to each PS pheromone, specifying a point in time in the past. Deposits of pheromones with different tags are not aggregated into one concentration by the infrastructure. Thus the collection of all PS pheromones at the same place with the same major flavor may be interpreted as a force profile over time (FIG. 4).

Regularly repeated deposits of a pheromone at a fixed spatio-temporal location quickly take the local pheromone concentration to an analytically predictable fixed point, which depends on the deposit rate and the evaporation and propagation factor of the particular pheromone flavor [4]. These deposits may be generated by the same or by different agents and any agent that knows the configuration of the pheromone is able to estimate the deposit rate from the sampled concentration, assuming that the fixed point has been reached when the sample is taken.

A Detector regularly, at a globally fixed rate, deposits one unit of the PS(R) pheromone at its current place. The pheromone is tagged with the current value of the internal variable that determines the agent's temporal focus. Thus all deposits from agents with the same focus aggregate into one local pheromone concentration. The fixed point reached by this concentration directly reflects the number of agents that share the same focus.

Deposits to the PS(A) pheromone are only generated regularly by a Detector if the agent is convinced that it is currently focused on a part of a pattern. Once the evidence computed by the agent has passed a certain threshold (see next Section), the agent starts depositing one unit of the attractive pheromone at regular intervals. Thus, the local PS(A) pheromone concentration relates directly to the "belief" of the Detector population that this location is part of a distinguishable pattern.

Both flavors of the PS pheromone propagate in space and time. A deposit of the pheromone with a particular temporal focus tag at a specific place immediately triggers weaker deposits at neighboring places and nearby points in time. This propagation mechanism, implemented in the Place agents, is a straight-forward temporal extension of the spatial propagation mechanism. It creates a smooth distributed force field over the represented space and time for each major flavor of the PS pheromone.

A Detector agent regularly executes a movement decision cycle. Each cycle begins with the agent's sampling the PS(A) and PS(R) concentrations at and nearby its current focus. The agent may choose to move only in space (neighboring place), only in time (increment/decrement temporal focus variable), or in both space and time; and for every potential new location of its focus, the agent samples the pheromone concentrations.

In its movement decision the agent combines the two opposing forces. For each potential new location it computes the relative attractive force and the relative repulsive force by normalizing the sampled PS(A) and PS(R) concentration for each option. Then it subtracts the repulsive force from the attractive force and normalizes the resulting values to add up to one. Now each of these normalized values represents the probability that the agent selects the particular location and the agent spins an appropriately weighted roulette wheel to make its choice. We present the advantages of combining multiple pheromone fields in the decision process in [5].

If the agent's choice includes a spatial movement, it executes its mobility protocol, which transfers the agent from one processing node to the next and which also changes the registration of the agent with a place. The temporal component of a move only requires the agent to change its internal variable.

The probabilistic movement of the Detector agents' focus guided by the dynamically changing force fields does not cover the whole search space evenly, but rather concentrates the agents near detected patterns. To ensure that the system as a whole remains adaptive to newly emerging patterns and also to provide sufficient ergodicity for the threshold adaptation process, we restrict the lifespan of an agent to a fixed number of movements. At the same time, each Place agent introduces new agents at a fixed rate, dynamically balancing the global population size and ensuring a minimum number of visits at each place.

The significance that a Detector agent assigns to the evidence presented in the data it currently observes depends on the overall situation in the system and thus requires global information. The current threshold above which the agent starts depositing attractive pheromones represents an estimate of the global background level, and must be collectively established across the Detector population.

A variant of Particle Swarm Optimization (PSO) [8], inspired by flocking, herding, and schooling behavior in animal populations, is used to adjust the threshold. Bird flocks coordinate their movement as individual birds align their heading and velocity with that of their nearby neighbors and move in the direction of the center of the flock [12]. In PSO, the task of a swarm of agents is to search some space. Agents are distributed over the space, and periodically compare their estimates of the function being searched with other nearby agents, adjusting their own best information on the basis of that of their neighbors. Most PSO implementations house all the agents on a single processor, and "nearby" is typically defined in terms of the data structure housing the agents.

We adapt this model to coordinate the deposit threshold across the Detector population. A Detector agent starts depositing PS(A) pheromones when the locally observed evidence passes a globally fixed percentage threshold of the maximum evidence presented anywhere in the system at that moment. To estimate this global maximum value across the agent population, agents individually keep a short term memory of their local observations and at regular intervals compare their estimate of the maximum with other randomly encountered agents. Because our agents are distributed over a network, their PSO interactions are defined by collocation in the network of place agents.

A Detector agent keeps a memory of the observed evidence during a fixed number of last steps and carries an estimate of the current global maximum evidence in the system. If, at any time the agent observes an evidence value larger than its current maximum estimate, it updates its estimate. At regular intervals, an agent randomly selects one of the other Detector agents that currently share the same place ("random encounter") and initiates a face-off interaction. In this interaction, the agents exchange and then modify their estimates to reflect the observations of the respective other.

A simple set of rules guides the exchange. Let ma be the maximum of the observed values of agent a and let Ma denote the agent's current estimate of the global maximum (mb and Mb denote the same values for agent b). After the exchange Ma and Mb are set to the same value computed as (max[ma,Mb]+max[mb,Ma]+max[ma,mb])/3. Thus, both agents adopt the mean of their estimates tempered by the actual observations of the respective interaction partner.

The random face-offs among the agents and the fact that their movements cover the whole search space ensure that the individual estimates eventually approximate the global maximum. Changes in the actual maximum value are soon detected and communicated among the Detector agents.

Deposits of the PS(A) pheromone indicate the presence of a potential pattern in the observed data streams. The purpose of this pheromone is to attract other Detector agents to this location, so it must be propagated to neighboring locations that may not be part of the pattern.

In addition to the "Search" pheromone (PS) we introduce a "Find" pheromone ($P_F$) that allows the Detector population to clearly mark a detected pattern. Deposits of $P_F$ pheromones, unlike those of $P_S$ pheromones, are not propagated by the infrastructure (zero propagation factor). Also, the $P_F$ pheromone evaporates much more slowly than the PS pheromone, and thus it takes longer for the local concentrations to approximate the fixed point under repeated deposits.

Whenever a Detector agent deposits a $P_S(A)$ pheromone, it also deposits a $P_F$ pheromone with the same temporal focus tag. Thus, at locations where the agents perceive sufficient evidence for the presence of a pattern, there will be a buildup of $P_F$ concentrations. The slower evaporation of the pheromone ensures that only if there is sustained evidence of a pattern will the $P_F$ pheromone concentrations reach a significant strength.

The global pattern of $P_F$ pheromone concentrations is the output of the pattern detection process. This pattern may be visualized for human operators and it also serves as input for the pattern classification process, described in the next section.

Pattern Classification

The pattern classification process seeks to highlight those of the detected patterns that express a particular spatial or temporal characteristic. For instance, in our demonstration we highlight only those patterns that extend in a particular spatial direction. Other classification schemes might, for instance, highlight patterns that join places with a particular characteristic or that extend across specific types of neighborhood relations among places.

Each applied classification scheme requires a population of Classifier agents that probabilistically move their individual focus across the spatio-temporal locations represented in the infrastructure according to the hypothesized pattern. Any Classifier, regardless of its association with a particular scheme, samples local $P_F$ pheromone locations which identify the patterns to the classification process. The chosen classification scheme is encoded into the agent's movement and pheromone deposit decision logic.

In general, Classifiers tend to linger at locations that belong to a pattern with a high ranking in the classification scheme and they also tend to deposit more pheromones there. All Classifiers deposit "Class" pheromones ($P_C$) to communicate their findings. Each scheme is associated with a different flavor of the $P_C$ pheromone.

The global pattern of $P_C$ pheromone concentrations is the output of the pattern classification process. Again, this pattern may be presented to human operators and it may also serve as input to additional processes, which, for instance, may cross-correlate various classifications. At this point, we do not yet present any such potential extensions.

EXAMPLE

To demonstrate the potential of distributed pattern detection and classification in the domain of biosurveillance, we implemented a simple scenario. The demonstration also serves as a verification of the main proposed coordination algorithms. It will be apparent to those skilled in the appropriate arts that the details of this demonstration are exemplary, not restrictive, and that the approach taught in this specification can readily be applied to a wide range of other problems configured in various ways.

In our demonstration we tile an abstract region with 75 by 75 rectangular places. Each place has eight neighbors—the places touching its edges and corners. We do not represent additional social relationships between places since we do not model an actual population.

We restrict ourselves to homogenous, static, and normalized data sources. We integrate three types of data sources into the system, of which at each place there exists one input stream. We assume that each data source at each place only delivers a fixed value between zero and one. In our visualization of the demonstration, we interpret each source as a component of a color value (RGB). For example, Red might represent over-the-counter tissue sales, Green antihistamine sales, and Blue workplace absenteeism. Thus, each place has a background color that represents its local input data.

Our Detector agents search for places whose local data is significantly different than the data in its neighborhood (e.g., higher sales of a certain class of over-the-counter remedies). Thus, at each step from one place to the next an agent measures the difference in the observed data and it assigns high evidence to a large differential.

Figure 5:
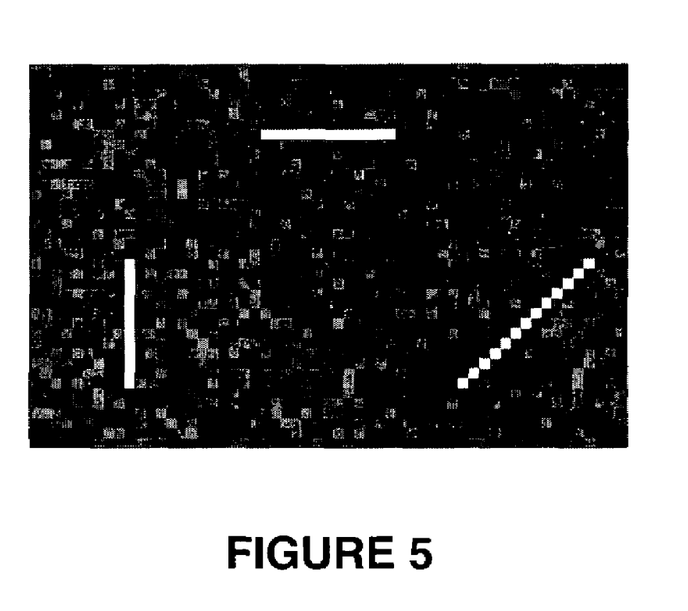
FIG. 5 is a picture that shows a global input pattern presented to detection and classification processes according to the invention.

FIG. 5 shows the input pattern that our fixed data sources present to the agents. Besides random background data, there is a horizontal, a vertical, and a diagonal pattern of high differential values. Such a global picture is only available to human experimenter. The agents are restricted to the local input data at their respective current place and also users of most deployed systems are not likely to be able to see the whole pattern, since it may be impossible to transfer all the data in time.

The pattern detection process presented in Section 3.2 has two major components. The Detector agents coordinate their movements to focus on potential patterns and they exchange information in random encounters to estimate the global maximum in the presented evidence. In our demonstration we only use static and normalized data sources and thus we did not implement the estimation mechanism. We only focus on spatial patterns, not temporal ones.

Figure 6:
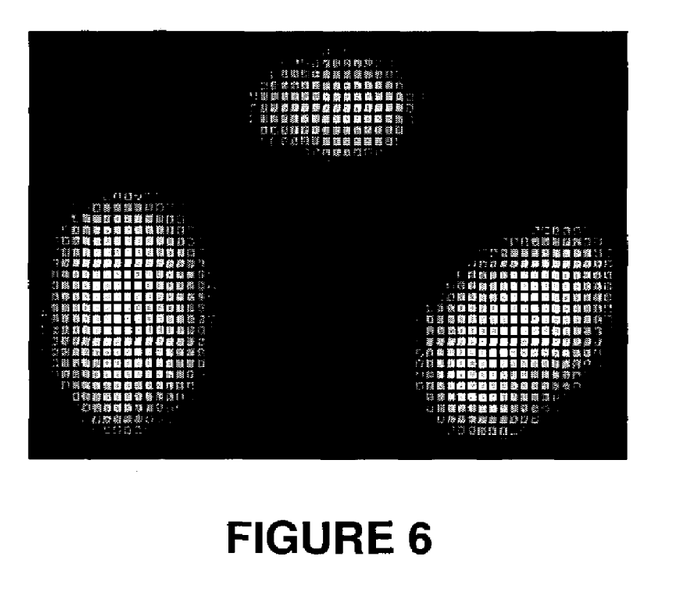
FIG. 6 illustrates a pattern of $P_S(A)$ pheromones that coordinate the movements of a detector.

FIG. 6 shows a snapshot of the local concentrations of the $P_S(A)$ pheromone, which the Detectors use to attract each other to potential patterns. The lighter the color of a place, the higher is its local pheromone concentration. We populated our 75 by 75 places infrastructure with 1000 Detectors, each of which is permitted to take 400 steps before it is replaced by a new agent at a random location.

Figure 7:
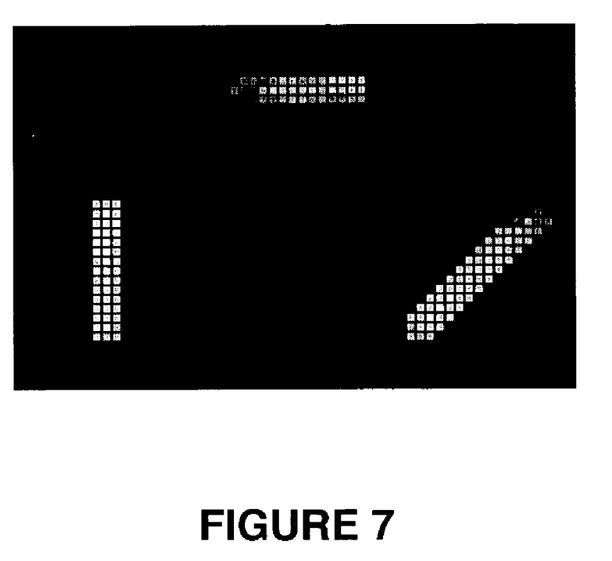
FIG. 7 shows a pattern of $P_F$ pheromones that represent a detector's findings.
Figure 8:
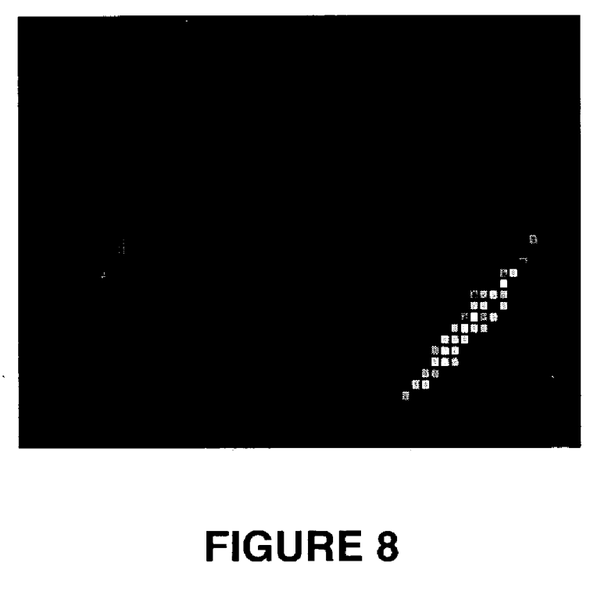
FIG. 8 shows a pattern of $P_C$ pheromones may be used to highlight a diagonal pattern.
Figure 9A:
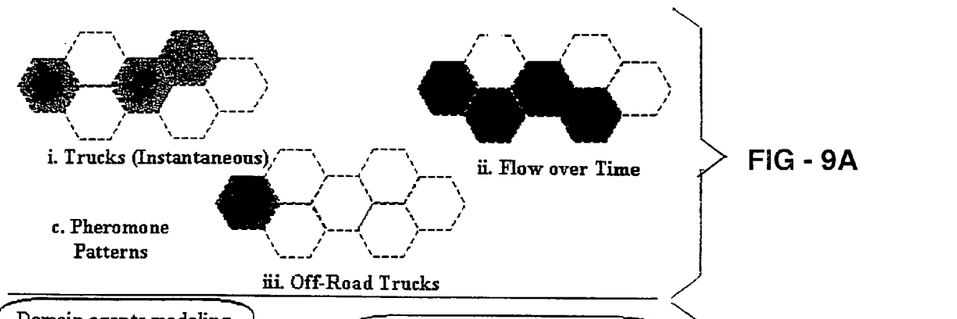
FIG. 9A depicts real elements of a stigmergic multi-agent system.
Figure 9B:
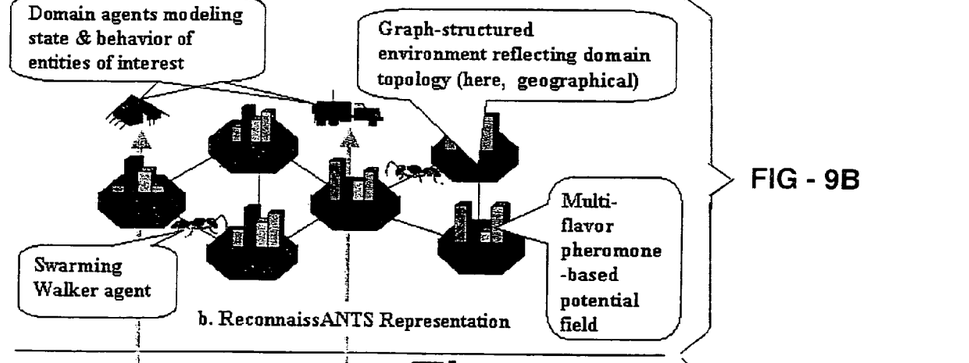
FIG. 9B shows a representation and processing architecture associated with FIG. 9A.
Figure 9C:
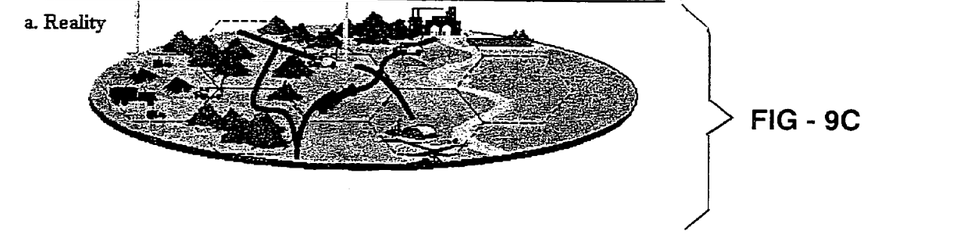
FIG. 9C provides potential displays showing patterns of different pheromones.

The non-propagating and only slowly evaporating $P_F$ pheromone indicates where the Detector population believes the current patterns are. The pattern is now reduced to a few pheromone concentrations, which easily can be shipped to the user for review. Also, each local concentration is effectively normalized since it is created under a global perspective provided by the movement of agents across the region. FIG. 7 shows a snapshot of the $P_F$ pattern as the local concentrations have stabilized. In our simulations, the agents quickly converged on the presented pattern and established a stable $P_F$ concentration field.

We implemented one pattern classification scheme in our demonstration. Assuming that a detected pattern may relate to an epidemic outbreak of a disease caused by an airborne bioterrorist pathogen, our Classifier agents highlight those patterns that are aligned with the direction of the wind.

We deploy 1000 Classifiers, which have a strong tendency (weighted probabilities) to move in a given direction across the infrastructure. The agents deposit a non-propagating, slowly evaporating $P_C$ pheromone. Thus, high stable concentrations of this pheromone indicate patterns that are aligned with the direction of the wind.

An agent-internal confidence level determines the probability that a Classifier deposits a $P_C$ pheromone. The agent's confidence grows if in successive steps it sees high $P_F$ concentrations and it decreases as it passes through a sequence of low concentrations. So, as an agent moves along a detected pattern, it becomes increasingly likely that this pattern is aligned with direction given to the agent population.

The agent's confidence level also influences its movement decision. With a low confidence, the agent rapidly proceeds to its given direction. But, as the agent's confidence grows, so does its probability to take a step in the opposite direction. As a consequence, Classifiers tend to linger on patterns that induce high confidence levels, which, in turn, result in increased $P_C$ pheromone deposit rates at the location of the pattern.

FIG. 8 shows the result of the pattern classification process in our demonstration. The wind was assumed to run diagonally across the region and thus of the three detected patterns (FIG. 7), only the diagonal one is highlighted in the $P_C$ pheromones.

This technology fuses diverse types, sources, and levels of information to detect hidden patterns. The technology is unique in the range of data that it provides to security analysts and other applicable users.

The Distributed, Decentralized nature of the approach, bringing processing to the data rather than moving data to a central process, makes it appropriate to the wide range of analysts, integrating new data in real time and providing human analysts with an interactive capability that can optimize signal acquisition to refine the understanding of emerging patterns.

In actual use, an analyst might select a particular information topology, be it geographic distribution, semantic network, social structure, or financial system. The system may then overlay a graphical display of this structure with shading, indicating pheromone flavor (color) and intensity (brightness). Patterns appear as regions of high pheromone concentration, and can be observed within a single topology, or across multiple topologies. For example, if the links between places in a secondary topology and those in the selected topology exceed a specified threshold, the secondary places appear in the display along with the primary one, with distinctive shapes to indicate the distinct topology. FIG. 9C illustrates three possible pheromone patterns in the geographic topology, based on the sensory input in FIG. 9A and the representation in FIG. 9B. Current truck locations (i) would suggest traffic from the city in the north, but a pheromone reflecting flow over time (ii) shows a more likely path from the airport in the south, and a pheromone that balances truck pheromone against highway pheromone reveals extensive off-road activity (iii) that might reflect construction of an underground bunker.

The analyst pages through displays of different pheromone flavors, and ranks them as +(interesting), −(boring), or no action (neutral), based on the patterns. The system rewards agents that produce pheromones leading to high-ranking patterns, intensifying such patterns. The agents adjust their behavior accordingly, and analysts can look inside high-ranking software agents to disassemble the pheromone logic and discover the underlying patterns.

1. REFERENCES

[1] D. Anhalt. The Changing Nature of Commercial Satcom and its Impact on U.S. Military Advantage. Satellite 2001, Office of Net Assessment, Washington, D.C., 2001.

[2] E. Bonabeau, M. Dorigo, and G. Theraulaz. Swarm Intelligence: From Natural to Artificial Systems. New York, Oxford University Press, 1999.

[3] E. Bonabeau and C. Meyer. Swarm Intelligence: A Whole New Way to Think About Business. Harvard Business Review, 79(May), 2001.

[4] S. Brueckner. Return from the Ant: Synthetic Ecosystems for Manufacturing Control. Ph.D. Thesis at Humboldt University Berlin, Department of Computer Science, 2000.

[5] S. Brueckner and H. V. D. Parunak. "Multiple Pheromones for Improved Guidance." Proceedings of the 2nd DARPA-JFACC Symposium on Advances in Enterprise Control. Minneapolis, Minn. USA. July, 2000.

[6] S. Brueckner and H. V. D. Parunak. "Analysis and Design of Self-Organizing Systems of Fine-Grained Agents." ERIM white paper available from the authors. July, 2001.

[7] P.-P. Grassé. La Reconstruction du nid et les Coordinations Inter-Individuelles chez Bellicositermes Natalensis et *Cubitermes* sp. La théorie de la Stigmergie: Essai d'interprétation du Comportement des Termites Constructeurs. Insectes Sociaux, 6:41-84, 1959.

[8] J. Kennedy, R. C. Eberhart, and Y. Shi. Swarm Intelligence. San Francisco, Morgan Kaufmann, 2001.

[9] H. V. D. Parunak. 'Go to the Ant': Engineering Principles from Natural Agent Systems. Annals of Operations Research, 75:69-101, 1997.

[10] H. V. D. Parunak, A. D. Baker, and S. J. Clark. The AARIA Agent Architecture: From Manufacturing Requirements to Agent-Based System Design. Integrated Computer-Aided Engineering, 8(1):45-58, 2001.

[11] H. V. D. Parunak, S. A. Brueckner, J. Sauter, and J. Posdamer. Mechanisms and Military Applications for Synthetic Pheromones. In Proceedings of Workshop on Autonomy Oriented Computation, 2001.

[12] C. W. Reynolds. Flocks, Herds, and Schools: A Distributed Behavioral Model. Computer Graphics, 21(4 (July)):25-34, 1987.

[13] G. Theraulaz, S. Goss, J. Gervet, and J. L. Deneubourg. Task Differentiation in Polistes Wasp Colonies: A Model for Self-Organizing Groups of Robots. In Proceedings of First International Conference on Simulation of Adaptive Behavior, pages 346-355, MIT Press, 1991.

We claim:

1. A swarming agent architecture for the distributed detection and classification of spatio-temporal patterns representative of biological populations, comprising:
   a population of mobile software agents in a computer network of processing nodes; and
   a service software agent at each node, enabling the mobile agents to perform the following functions:
   a) share information on an indirect basis,
   b) coordinate activities across the entire biological population, and
   c) detect and classify one or more of the spatio-temporal patterns based upon the information sharing, coordinated activities, or both; and
   a processor to perform data acquisition data fusion, or control functions in accordance with the patterns to simulate the behavior of a biological population, and output the results of the simulation to predict what might happen if the patterns actually arose.

2. The architecture of claim 1, wherein the spatio-temporal patterns occur in a heterogeneous real-time data stream.

3. The architecture of claim 1, wherein one or more of the spatio-temporal patterns are associated with a biological population.

4. The architecture of claim 1, wherein one or more of the spatio-temporal patterns are associated with an environment.

5. The architecture of claim 1, wherein one or more of the spatio-temporal patterns are associated with an event.

6. The architecture of claim 1, wherein one or more of the spatio-temporal patterns are associated with a network.

7. The architecture of claim 6, wherein the network is related to communications or energy.

8. The architecture of claim 1, wherein one or more of the spatio-temporal patterns are associated with surveillance.

9. The architecture of claim 1, wherein the definition of a pattern depends on the particular application of the detection mechanism.

10. The architecture of claim 1, including detector agents that search for spatio-temporal structures and classifier agents that classify the detected patterns according to a predetermined classification scheme.

11. The architecture of claim 10, wherein the detector agents are attracted to locations which other detectors identified as part of a potential pattern, and repelled by large concentrations of other detector agents.

12. The architecture of claim 10, wherein the pattern classification scheme expresses a particular spatial or temporal characteristic.

13. The architecture of claim 1, including places to represent the structure of the problem space in which the agents coordinate their activities.

14. The architecture of claim 13, wherein the places represent a physical space.

15. The architecture of claim 13, wherein the places represent a temporal space.

16. The architecture of claim 13, wherein the places represent an abstract space.

17. The architecture of claim 13, further including a place agent at the location of the processing to gather data from local sources and for storage to provide ready access.

18. The architecture of claim 13, wherein the place agent provides application agents with a unified interface to the data streams covered by the place.

19. The architecture of claim 13, wherein, the agents are operative to change focus by moving to a neighboring place, or by incrementing or decrementing an internal variable.

20. The architecture of claim 1, further including a data provider giving mobile agents access to data characteristics of the segment of the domain represented by the processing node.

21. A computer system programmed to implement the architecture of claim 1.

22. A swarming agent architecture for the distributed detection and classification of spatio-temporal patterns representative of biological populations, comprising:
    a population of mobile software agents in a computer network of processing nodes, including:

detector software agents that search for the spatio-temporal patterns, and classifier software agents that classify the detected patterns according to a predetermined classification scheme; and a processor to perform data acquisition data fusion, or control functions in accordance with the patterns to simulate the behavior of a biological population, and output the results of the simulation to predict what might happen if the patterns actually arose.

23. The architecture of claim 22, wherein the spatio-temporal patterns occur in a heterogeneous real-time data stream.

24. The architecture of claim 22, wherein new classification schemes are introduced at different times through new agent populations.

25. A computer system programmed to implement the architecture of claim 24.

26. The architecture of claim 22, wherein one or more of the spatio-temporal patterns are associated with an environment.

27. The architecture of claim 22, wherein one or more of the spatio-temporal patterns are associated with an event.

28. The architecture of claim 22, wherein one or more of the spatio-temporal patterns are associated with a network.

29. The architecture of claim 28, wherein the network is related to communications or energy.

30. The architecture of claim 22, wherein one or more of the spatio-temporal patterns are associated with surveillance.

31. The architecture of claim 30, wherein the pattern classification scheme expresses a particular spatial or temporal characteristic.

32. The architecture of claim 22, wherein the definition of a pattern depends on the particular application of the detection mechanism.

33. The architecture of claim 22, wherein the detector agents are attracted to locations which other detectors identified as part of a potential pattern, and repelled by large concentrations of other detector agents.

34. The architecture of claim 22, including places to represent the structure of the problem space in which the agents coordinate their activities.

35. The architecture of claim 34, wherein the places represent a physical space.

36. The architecture of claim 34, wherein the places represent a temporal space.

37. The architecture of claim 34, wherein the places represent an abstract space.

38. The architecture of claim 34, further including a place agent at the location of the processing to gather data from local sources and for storage to provide ready access.

39. The architecture of claim 34, wherein the place agent provides application agents with a unified interface to the data streams covered by the place.

40. The architecture of claim 34, wherein, the agents are operative to change focus by moving to a neighboring place, or by incrementing or decrementing an internal variable.

* * * * *